United States Patent
Kim et al.

(10) Patent No.: US 8,194,695 B2
(45) Date of Patent: Jun. 5, 2012

(54) TERMINAL AND METHOD FOR WIRELESS SENSOR NETWORK FOR DETERMINING CONTENTION WINDOWS IN CONTENTION-BASED CHANNEL ACCESS

(75) Inventors: Eui Jik Kim, Suwon-si (KR); Sun Gi Kim, Seoul (KR); Hyo Hyun Choi, Seoul (KR); Vu Thuy Dan Nguyen, Yongin-si (KR); Jeong Geun Kim, Yongin-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 669 days.

(21) Appl. No.: 12/351,902

(22) Filed: Jan. 12, 2009

(65) Prior Publication Data
US 2009/0180452 A1 Jul. 16, 2009

(30) Foreign Application Priority Data
Jan. 11, 2008 (KR) ........................ 10-2008-0003591

(51) Int. Cl.
*H04L 12/403* (2006.01)
(52) U.S. Cl. ........................................ 370/448; 370/461

(58) Field of Classification Search .................. 370/338, 370/445–448, 461–462, 230, 252, 329, 345, 370/454, 458–459, 468; 455/502, 516
See application file for complete search history.

(56) References Cited

U.S. PATENT DOCUMENTS

| 7,881,340 B2* | 2/2011 | Farrag et al. .................. 370/468 |
| 7,944,940 B2* | 5/2011 | Ma et al. ....................... 370/447 |
| 2005/0070317 A1* | 3/2005 | Liu ............................... 455/502 |
| 2005/0243788 A1* | 11/2005 | Janczak ........................ 370/341 |

OTHER PUBLICATIONS

Xiangyu et al, "Performance Analysis of Hybrid Backoff Algorithm of Wireless LAN", IEEE, 2007.*

* cited by examiner

*Primary Examiner* — Habte Mered
(74) *Attorney, Agent, or Firm* — Cha & Reiter, LLC

(57) ABSTRACT

A communication terminal and method is provided for improving channel utilization efficiency in a wireless sensor network using contention-based channel access mechanism is disclosed. The communication method according to the present invention comprises initializing, when a packet transmission is required, a contention window to a size; resetting, when a channel is assessed to be busy, the size of the contention window in a hybrid expansion mode; and attempting, when the channel is assessed to be idle, the packet transmission through the channel.

14 Claims, 5 Drawing Sheets

TERMINAL AND METHOD FOR WIRELESS SENSOR NETWORK FOR DETERMINING CONTENTION WINDOWS IN CONTENTION-BASED CHANNEL ACCESS

CLAIM OF PRIORITY

This application claims the benefit of the earlier filing date, pursuant to 35 USC 119, to that patent application entitled "COMMUNICATION TERMINAL AND METHOD FOR WIRELESS SENSOR NETWORK," filed in the Korean Intellectual Property Office on Jan. 11, 2008 and assigned Serial No. 10-2008-0003591, the contents of which are incorporated herein by reference.

BACKGROUND OF THE INVENTION

1. Field of the Invention

The present invention relates to a wireless sensor network and, in particular, to a communication terminal and method for a wireless sensor network in which a plurality of terminals contend to transmit packets through a shared single channel in an active period.

2. Description of the Related Art

A wireless sensor network can be implemented in the form of Wireless Local Area Network (WLAN) and Wireless Personal Area Network (WPAN) technologies in consideration of sensing area coverage. Typically, a WLAN is implemented on the basis of the Institute of Electrical and Electronics Engineers (IEEE) 802.11 standard which specifies wireless access network having a range up to 100 m. Meanwhile, a WPAN may also be implemented using the IEEE 802.16 based technologies, e.g., Bluetooth, ZigBee, and Ultra Wideband (UWB). A wireless sensor network is composed of a plurality of terminals that share a single communication channel and transmit data during active periods. That is, each terminal collects data in real time and sends the collected data in the form of a packet during an active period.

In the conventional wireless sensor network, each sensor node attempts to transmit the packet during a contention window defined in the active period. If the channel assessed is available, then the sensor node transmits the packet. However, if the channel assessed is unavailable or fails to transmit the packet, the sensor node resets the contention window, which is elongated in exponential manner, and retries to transmit the packet. Accordingly, as the number of reattempts of the packet transmission increases, the contention window expands exponentially, resulting in degradation of channel utilization efficiency.

SUMMARY OF THE INVENTION

The present invention provides a communication terminal and method for a wireless sensor network that is capable of improving channel utilization efficiency.

In accordance with an exemplary embodiment of the present invention, a communication method for a terminal in a wireless sensor network using a contention-based channel access mechanism includes initializing, when a packet transmission is required, a contention window to a known size, resetting, when a channel is assessed to be busy, the size of the contention window in a hybrid expansion mode and attempting, when the channel is assessed to be idle, the packet transmission through the channel.

In accordance with another exemplary embodiment of the present invention, a communication terminal in a wireless sensor network using a contention-based channel access mechanism includes a memory unit which stores a packet carrying data collected by the terminal, a control unit which initializes, when a packet transmission is required, a contention window to a known size, resets, when a channel is assessed to be busy, the size of the contention window in a hybrid expansion mode, and attempts, when the channel is assessed to be idle, the packet transmission through the channel and a radio frequency unit which collects the data and transmits the packet when the channel is assessed to be idle.

BRIEF DESCRIPTION OF THE DRAWINGS

The above and other aspects, features and advantages of certain exemplary embodiments of the present invention will be more apparent from the following description taken in conjunction with the accompanying drawing, in which.

DETAILED DESCRIPTION OF THE INVENTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

In the following description, the term "Contention Window (CW)" denotes a time duration that needs to be clear of channel activity before transmission can commence. The term "CW size" denotes a number of timeslots (back-off periods) defining the CW length and "$CW_{min}$" denotes a minimum size of the CW set in an active period of a terminal.

The term "reset count (i)" denotes a number of resets of the size of CW. That is, the reset count means a number of assesses of the channel state. The term "maximum reset count ($i_{max}$)" denotes the maximum number of resets of the CW for restricting the resetting times. The term "expansion count (n)" denotes a number of expansion resets of the CW in which the size of the CW is expanded. The expansion count is compared with the reset count. In the present invention, the terminal compares the reset count (i) with the expansion count (n) and determines whether to increase the size of the CW linearly or exponentially depending on the comparison result.

The term "linear expansion constant (c)" denotes a parameter for increasing the size of the CW linearly. That is, the linear expansion constant is added to the CW set in the active period so as to linearly increase the size of the CW when the linear expansion mode is determined. The term "exponential expansion constant (e)" denotes a parameter for increasing the size of the CW exponentially. That is, the exponential expansion constant (e) is multiplied with the CW set in the active period so as to exponentially increase the size of the CW when the exponential expansion mode is determined.

Figure 1A:
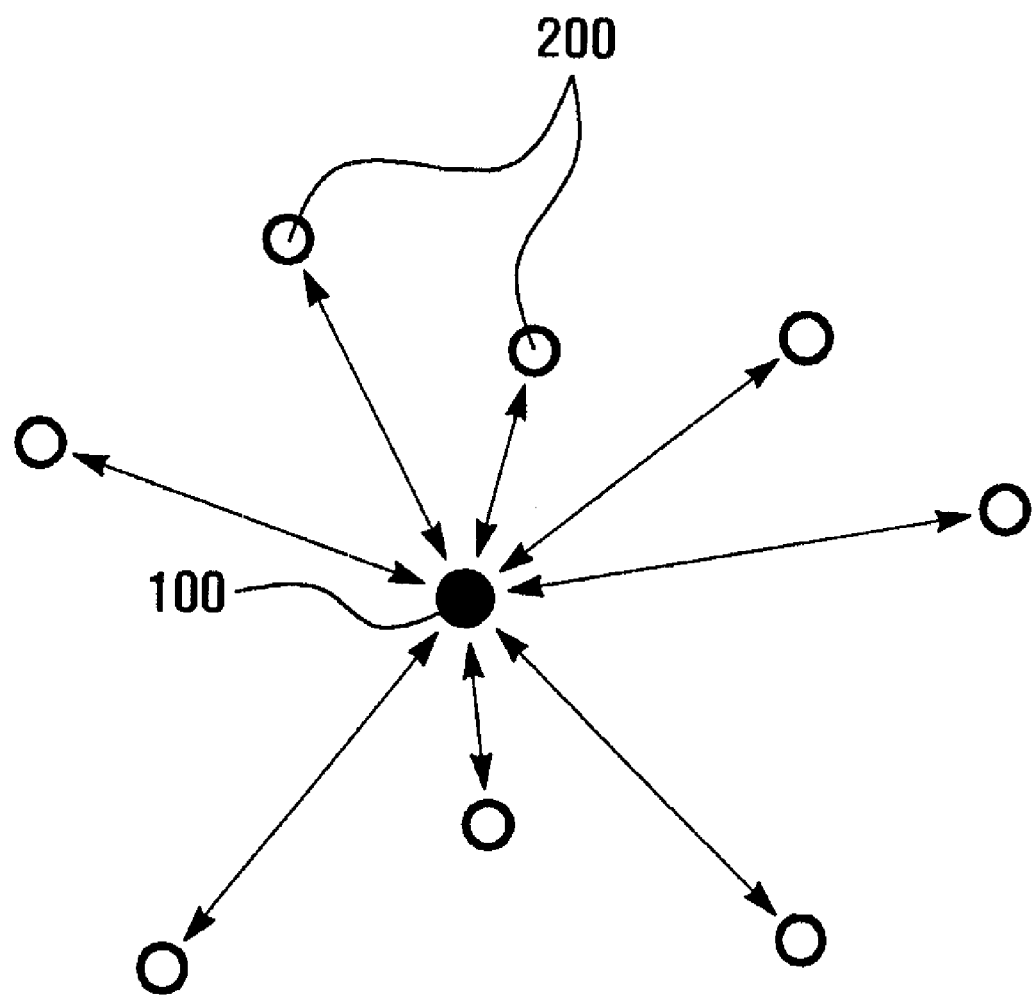
FIG. 1A is a diagram illustrating a star network topology wireless sensor network according to an exemplary embodiment of the present invention.
Figure 1B:
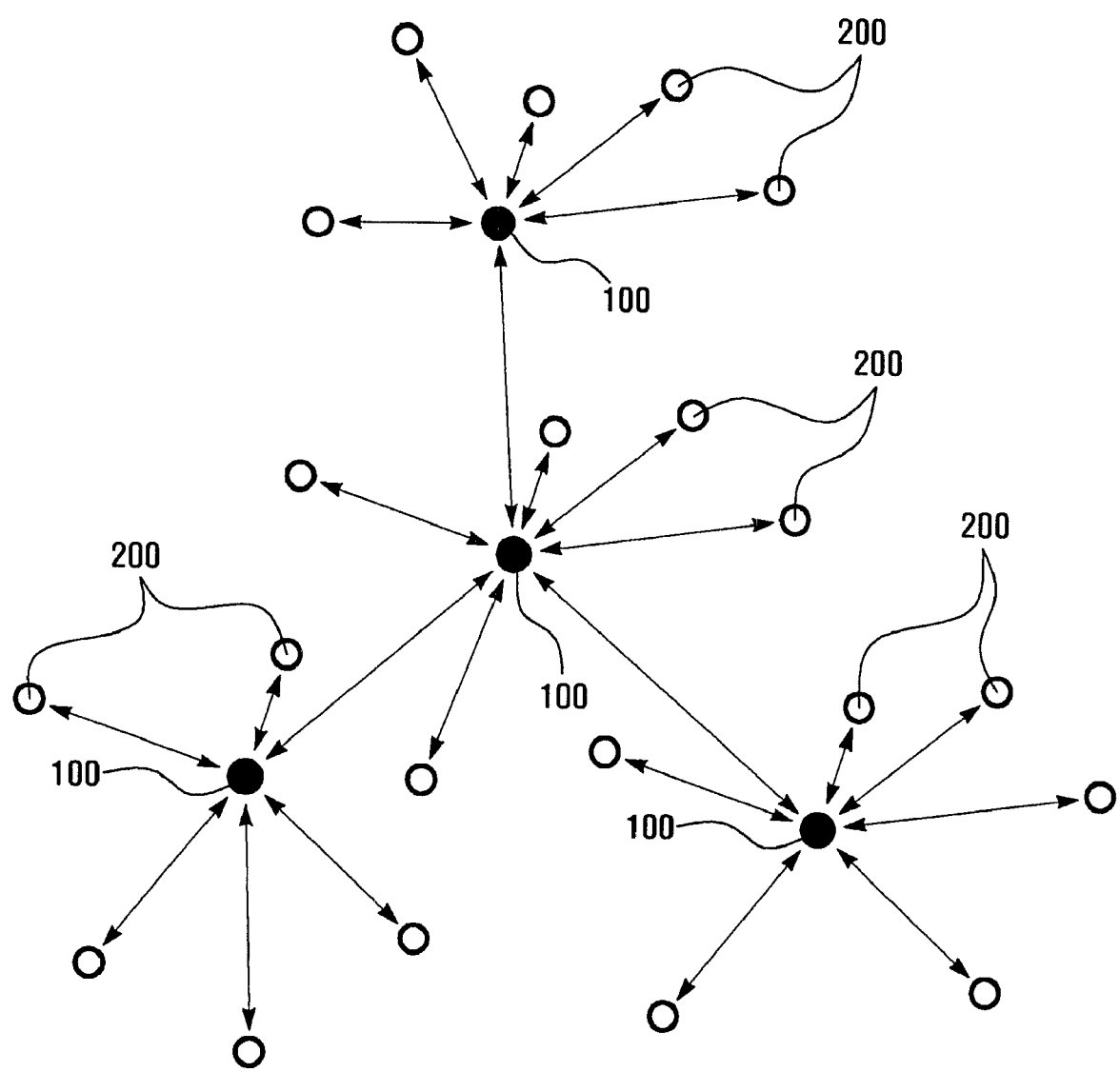
FIG. 1B is a diagram illustrating a clustered tree topology wireless sensor network according to an exemplary embodiment of the present invention.

FIG. 1A is a diagram illustrating a star network topology wireless sensor network according to an exemplary embodiment of the present invention, and FIG. 1B is a diagram illustrating a clustered tree topology wireless sensor network according to an exemplary embodiment of the present invention. In the following description, it is assumed that the wireless sensor network is an IEEE 802.15.4 standard-based wireless personal area network (WPAN).

Referring to FIGS. 1A and 1B, a WPAN is composed of a plurality of communication terminals 100 and 200. Here, reference numeral 100 denotes network coordinators, and numeral 200 denotes network devices. Each WPAN has a unique identifier (ID), and the devices 200 communicate with the coordinator 100 through a shared channel. The WPAN can be implemented with a single PAN coordinator (see FIG. 1A) or clustered multiple coordinators (see FIG. 1b). The sub-network coordinators act as network devices to a PAN coordinator. The devices 200 communicate with the coordinator 100 in unit of superframe.

The network coordinator 100 manages the WPAN. The network coordinator 100 can be elected from any of communication terminals 100 and 200. The network coordinator 100 communicates with the devices 200. The network coordinator 100 can allow a device to join or leave the network. The network coordinator 100 broadcasts a beacon frame periodically and transmits packets between the devices 100 and 200 within the network. The network devices receiving the beacon frame can communicate with the coordinator 100. Since the devices 200 located within the same network share a single channel, they contend to occupy the channel such that the device preoccupying the channel transmits a packet to the coordinator 100.

Figure 2:
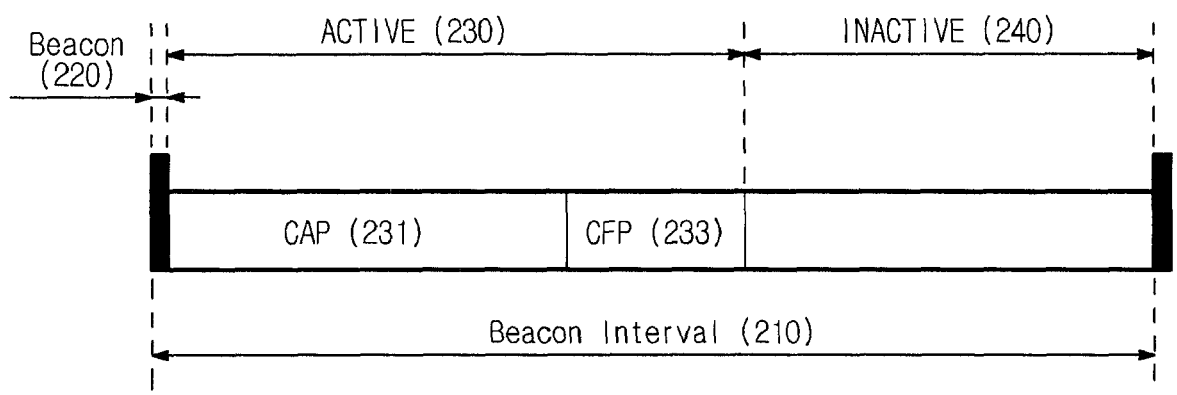
FIG. 2 is a diagram illustrating a structure of a superframe for use in a WPAN according to an exemplary embodiment of the present invention.

The structure of a superframe is described hereinafter with reference to FIG. 2 in detail. FIG. 2 is a diagram illustrating a structure of a superframe for use in a WPAN according to an exemplary embodiment of the present invention.

Referring to FIG. 2, the superframe begins with a beacon period 220 that is followed by an active period 230 and an optional inactive period 240. The length of a superframe is defined by the beacon interval 210. All communication takes place in the active period 230. The nodes 100 and 200 are turned on in the active period 230 and turned off, entirely or partially, in the inactive period 240 to conserve energy. The lengths of the active and inactive periods 230 and 240 are determined by the network coordinator 100 and this information is provided to the network devices 200 via the beacon frame. That is, the network coordinator 100 transmits within the beacon frame 220 at least start and end time points of the active period 230.

The active period of a superframe consists of a Contention Access Period (CAP) 231 and a Contention Free Period (CFP) 233. In the CAP 231, the terminal 200 contend with other terminals in the same cluster using a well-known Carrier Sense Multiple Access/Collision Avoidance (CSMA/CA) scheme. That is, the network terminals 200 set their CWs and contend among each other to occupy the channel within the CWs. The terminal 200 gaining access to the channel, transmits its packet to the network coordinator 200. In the CFP 233, the network coordinator 100 allocates guaranteed timeslots (GTS) to the network terminal 200 so as to access the channel without contention.

Figure 3:
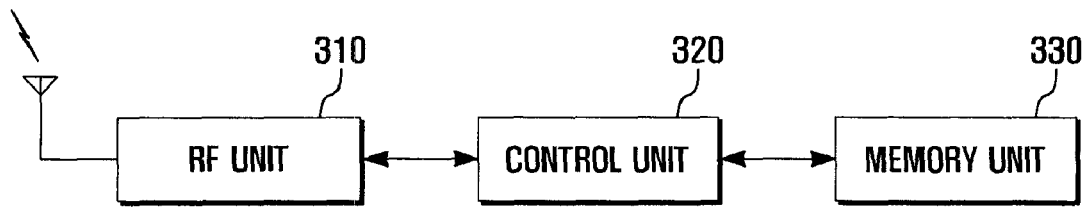
FIG. 3 is a schematic block diagram illustrating a configuration of a network terminal according to an exemplary embodiment of the present invention.

The structure of a network terminal of the WPAN is described in detail with reference to FIG. 3. FIG. 3 is a schematic block diagram illustrating a configuration of a network terminal according to an exemplary embodiment of the present invention.

Referring to FIG. 3, the network terminal 100 (or 200) includes a Radio Frequency (RF) unit 310, a control unit 320, and a memory unit 330.

The RF unit 310 is responsible for radio communication with another network terminal. The RF unit 310 includes an RF transmitter for up-converting and amplifying transmission signal frequency and an RF receiver for low noise amplifying and down-converting reception signal.

The control unit 320 controls general operations of the network terminal. The control unit 320 includes a data processing part having a transmitter for coding and modulation of the transmission signal and a receiver for demodulating and decoding the reception signal. The data processing part may include a modem and a codec.

The control unit 320 controls the RF unit 310 to collect data in real time and creates packets carrying the collected data. When the network terminal receives a beacon frame, the control unit determines whether to transmit the packets. If packets are to be transmitted, the control unit 320 sets the CW to a minimum value in the active period 230. At this time, the control unit 320 increments the reset count by one.

The control unit 320 also assesses whether the channel is to be idle in the CW. If the channel is assessed to be busy, then the control unit 320 compares the current reset count (i) and the expansion count (n) and increases the size of the CW in a linear manner or an exponential manner, depending on the comparison result. The control unit 320 sets the expanded CW in the active period 230. At this time, the control unit 320 increments the reset count by one. Otherwise, if the channel is assessed to be idle, then the control unit 320 transmits the collected packets through the RF unit 310.

The memory unit 330 includes a program memory and a data memory. The program memory stores the operating system of the network terminal and application programs for enabling communication in the wireless sensor network. The data memory stores the data generated while the programs run. The memory unit 330 stores the data collected in real time and packets containing the collected data under the control of the control unit 320. The memory unit 330 also stores parameters including a size of the timeslot, expansion count, linear expansion constant and exponential expansion constant.

Figure 4:
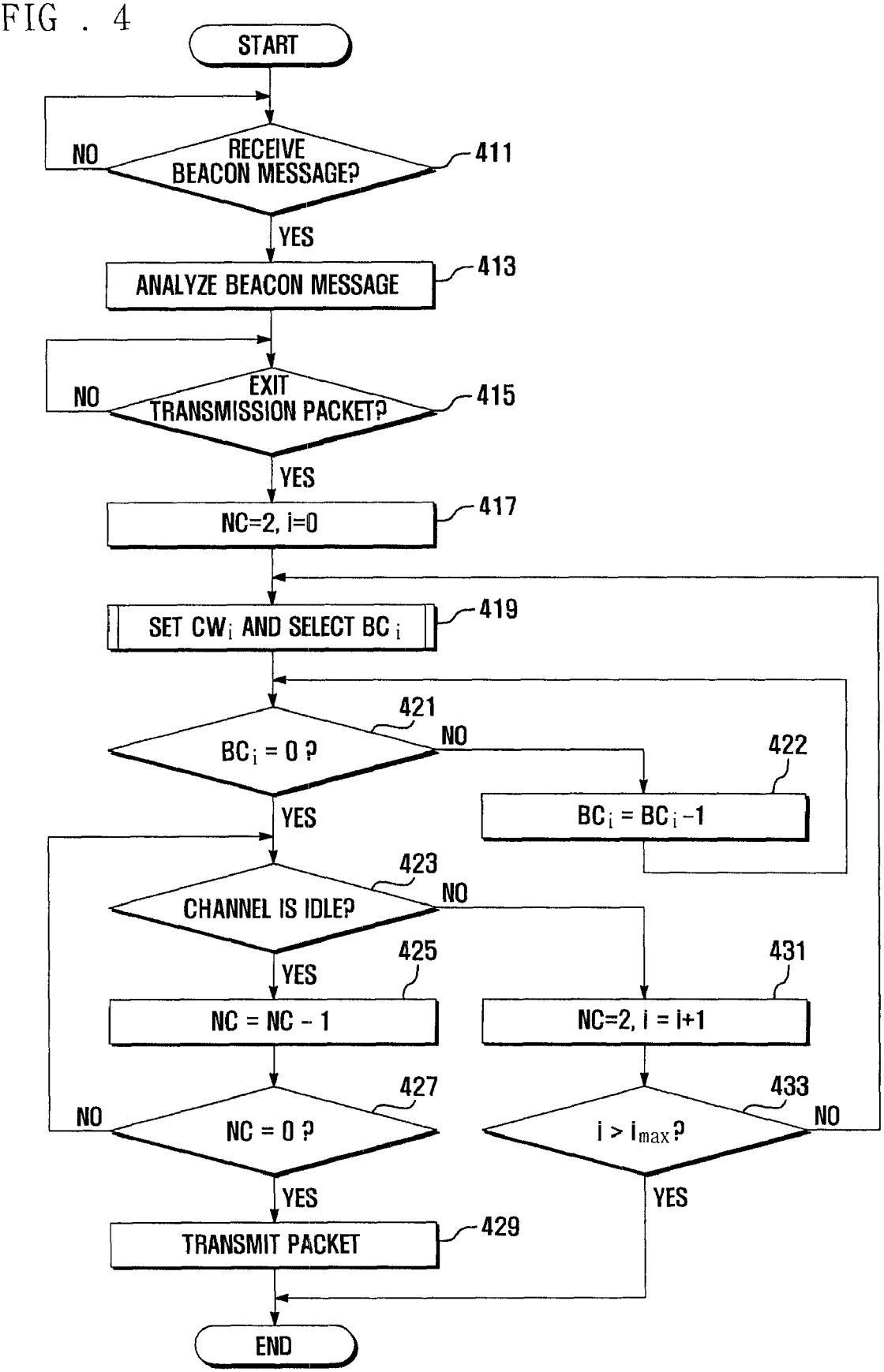
FIG. 4 is a flowchart illustrating a communication method of a network terminal according to an exemplary embodiment of the present invention.

FIG. 4 is a flowchart illustrating a communication method of a network terminal according to an exemplary embodiment of the present invention.

Referring to FIG. 4, the control unit 320 waits for receiving a beacon message 220 (step 411). If a beacon message 220 is received, the control unit 320 analyzes the beacon message 220 and extracts the information including the ID of the coordinator transmitted the beacon message 220, and the start and end time points of the active period 230 (step 413).

Next, the control unit 320 determines whether a packet to be transmitted exists (step 415). That is, the control unit 320 checks whether there is a packet generated with the data collected before receiving the beacon message 220. Also, the control unit 320 can check whether there is data collected after receiving the beacon message 220. If there is a packet to be transmitted, then the control unit 320 initializes the reset count to 0 (step 417) since no CW is set in the active period. The control unit 320 also determines the idle channel count (NC). For example, the control unit 320 can set the idle channel count to 2.

Next, the control unit 320 sets the contention window (CW) in the active period 230 and selects one of time slots constituting the CW randomly (step 419). The CW size is determined according to the reset count. The CW size setting and timeslot selection procedure is described in more detail with reference to FIG. 5.

Next, the control unit 320 checks the sequence number of a randomly selected timeslot and determines whether the sequence number is 0 (step 421). If sequence number of the randomly selected timeslot is not 0, then the control unit 320 selects the timeslot having a sequence number decremented by a value of one (1) (step 422). The timeslot selection is repeated until the timeslot having a sequence number of zero (0) is found. If the sequence number of the randomly selected time slot is 0, the control unit 320 assesses whether the channel is to be idle (step 423). The channel assessment can be performed on the boundary of the selected timeslot in the CW. That is, the control unit 320 determines whether the channel is busy or idle, on the basis of carrier sense using the well-known Clear Channel Assessment (CCA) scheme. If the channel is assessed to be idle, then the control unit 320 decrements the idle channel count (NC) by the value of one (1)e (step 425). That is, when it is determined that the channel is to be idle, the control unit 320 decrements the idle channel count (NC) by one. Next, the control unit 320 determines whether the idle channel count (NC) is zero (0) (step 427). If the idle channel count (NC) is zero (0), the control unit 320 transmits the packet (step 429) and ends the data transmission.

If the channel is determined to be busy at step 423, the control unit 320 increments the reset count by one (1) (step 431). Since the CW is initialized in the active period 230 already, the control unit 320 increments the reset count (i) by one (1). At step S431, the control unit 431 also resets the idle channel count. The idle channel count is reset regardless of the previously set idle channel count. For example, the control unit 320 can initialize the idle channel count to 2 again. Next, the control unit 320 determines whether the reset count (i) is greater than a maximum reset count (step 433). If the reset count (i) is not greater than the maximum reset count, then the control unit 431 repeats step 419 to step 433.

Meanwhile, if the idle channel count is not zero (0), then the control unit 320 repeats steps step 423 to step 433.

Figure 5:
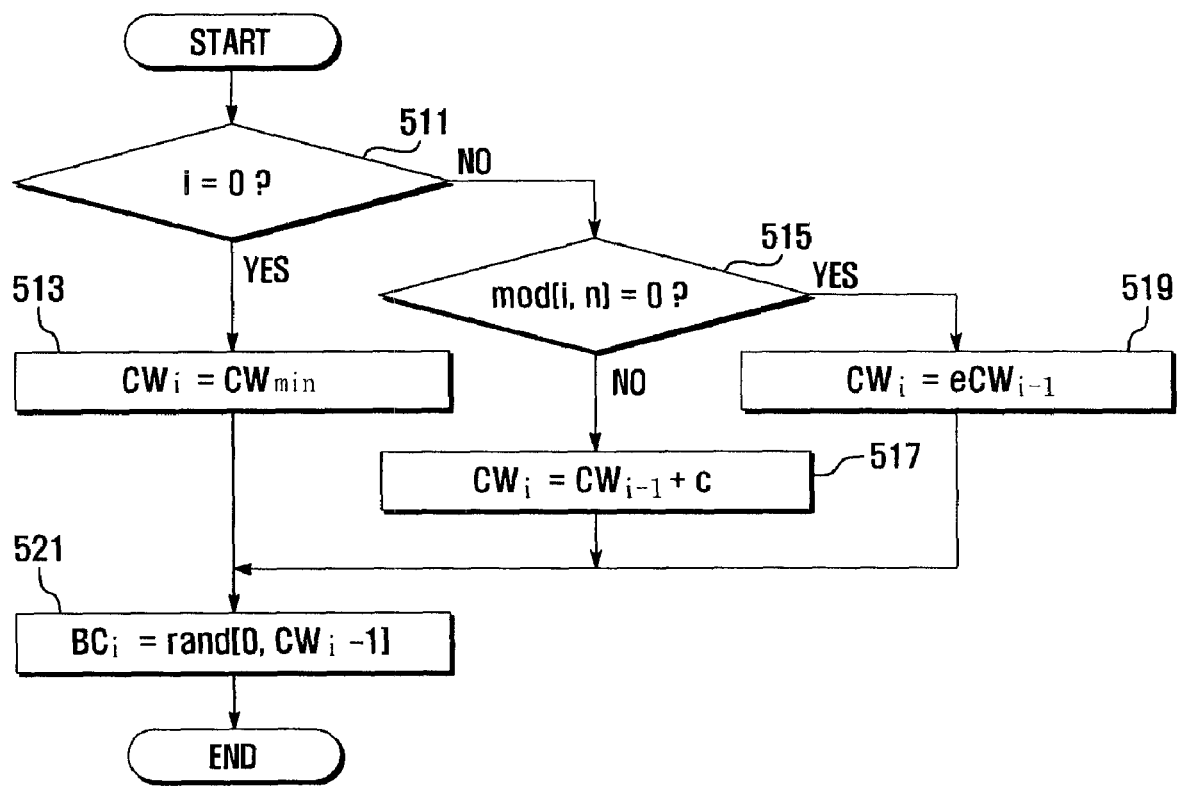
FIG. 5 is a flowchart illustrating a contention window setting procedure of the communication method of FIG. 4.

If the reset count is greater than the maximum reset count at step 433, then the control unit 320 ends the data transmission. Although the idle channel count has been referred to a being set to a value of two (2), it would be recognized that this value is selected merely to describe the invention and is not limited to the particular value recited herein. FIG. 5 is a flowchart illustrating a contention window setting procedure of the communication method of FIG. 4.

Referring to FIG. 5, the control unit 320 determines whether the reset count (i) is zero (0) (step 511). That is, the control unit 320 checks whether a CW is for a new packet transmission. If the reset count is zero (0), the control unit 320 sets the CW to the minimum size in the active period (step 513). The CW is determined according to equation (1). The control unit 320 sets the CW at the start time point of the active period 230.

$$CW_i = CW_{min}, \ i=0 \qquad (1)$$

wherein i is the number of resets,
CW$_i$ is the size of the contention window, and
CW$_{min}$ is a minimum size of the contention window.

For example, the control unit 320 sets allocates the first j (e.g., 8) timeslots of the active period 230 for the contention window.

If the reset count is not zero (0), the control unit 320 defines a modular function with the reset count and expansion count and determines whether value of the modular function is zero (0) ( step 515). That is, the control unit 320 takes a residue obtained by dividing the reset count value by the expansion count value and determines whether the residue is zero (0). If the value of the modulation function is not zero (0), the control unit 320 determines the linear CW expansion and sets a linearly expanded CW in the active period 230 (step 517). The size of the CW is determined according to equation (2). That is, the CW size is updated by adding a linear expansion constant to the previous CW size. The CW is set from the time point at which the channel assessment is done.

$$CW_i = CW_{i-1} + c, \ \mathrm{mod}\,(i,n) \neq 0 (i \geq 1) \qquad (2)$$

wherein i is the number of resets,
CW$_i$ is the size of the contention window,
CW$_{i-1}$ is a previous size of the contention window,
c is a linear expansion constant, and
n is a number of expansion resets in which the size of contention window is expanded.

Accordingly, in the case when the reset count is one (1), the previous CW size is 8, and the linear expansion constant is set to 2, the CW is expanded to 10 in size. That is, the control unit 320 resets the number of timeslots of the CW from 8 to 10. In another case if the reset count is 2, the previous CW size is 10, the linear expansion constant is 2, and expansion count is 3, the CW is expanded to 12. That is, the control unit 320 resets the number of slots of the CW from 10 to 12.

If the value of the modular function is zero (0), the control unit 320 determines the exponential CW expansion and sets an exponentially expanded CW in the active period 230 (step 519). The CW size is determined according to equation (3). That is, the CW size is updated by multiplying an exponential expansion constant with a previous CW size. The CW is set from the time point at which the channel assessment is done.

$$CW_i = eCW_{i-1}, \ \mathrm{mod}(I,n)=0(i \geq 1) \qquad (3)$$

wherein i is the number of resets,
CW$_i$ is the size of the contention window,
CW$_{i-1}$ is a previous size of the contention window,
e is an exponential expansion constant, and
n is a number of expansion resets in which the size of contention window is expanded.

As an example, when the reset count is 3, the previous CW size is 12, the exponential expansion constant is 2, and the expansion count is 3, the new CW size becomes 24. That is, the control unit 320 resets the number of timeslots of the CW from 12 to 24.

After resetting the CW size, the control unit 320 randomly selects one of the timeslots constituting the CW (step 521). Here, the timeslot is selected according to equation 4. That is, the control unit 320 selects one of the timeslots except for the first and last timeslots of the CW.

$$BC_i = \mathrm{rand}[0, CW_i\text{-}1], \ i \geq 0 \qquad (4)$$

wherein i is the number of resets,
BC$_i$ is a timeslot selected in the contention window,
CW$_i$ is the size of the contention window.

As an example, when the reset time is 0, and the CW size is 8, the control units selects one of the $0^{th}$ to $7^{th}$ timeslots of the CW. When the reset time is 3, and the CW size is 24, the control unit 320 selects one of the $0^{th}$ to $24^{th}$ timeslots of the CW.

Although the reset count, i.e. the number of channel assessments for a packet transmission, is used for calculating the CW size, the present invention is not limited thereto. For example, the communication method of the present invention can be implemented without consideration of the number of channel assessments. In this case, the network terminal can transmit the packet, once the channel is assessed to be idle.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail herein, it should be clearly understood that many variations and/or modifications of the basic inventive concepts herein taught which may appear to those skilled in the present art will still fall within the spirit and scope of the present invention, as defined in the appended claims.

As described above, the communication terminal and method for a wireless sensor network increases the size of a contention window, which is reset when a channel is assessed to be busy, in a linear expansion mode and in an exponential expansion mode after a specific number of resets, thus, preventing the contention window from expanding abruptly and achieving improvement in channel utilization efficiency of the communication terminal.

What is claimed is:

1. A communication method for a terminal in a wireless sensor network using a contention-based channel access mechanism, comprising:
   initializing a contention window to a known size, when a packet transmission is required;
   counting a number of resets of the contention window;
   resetting the size of the contention window in a hybrid expansion mode including increasing the size of the contention window one of linearly and exponentially when a parameter indicates linear expansion or exponential expansion, respectively, when a channel is assessed to be busy; and
   attempting the packet transmission through the channel, when the channel is assessed to be idle,
   wherein increasing the size of the contention window linearly comprises calculating a new size of the contention window as:

$CW_i = CW_{i-1} = c, \mod(i,n) \neq 0 (i \geq 1)$ wherein i is the number of resets,
      $CW_i$ is the size of the contention window,
      $CW_{i-1}$ is a previous size of the contention window,
      c is a linear expansion constant, and
      n is a number of expansion resets in which the size of contention window is expanded.

2. The communication method of claim 1, wherein increasing the size of the contention window exponentially comprises calculating a new size of the contention window as:

$CW_i = eCW_{i-1}, \mod(i,n) = 0 (i \geq 1)$ wherein e is an exponential expansion constant.

3. The communication method of claim 1, wherein initializing the contention window comprises calculating the size of the contention window as:

$CW_i = CW_{min}, i=0,$ wherein the $CW_{min}$ is a minimum size of the contention window.

4. The communication method of claim 3, wherein the number of expansion resets is 3, the linear expansion constant is 2, and the exponential constant is 2, and the minimum size of the contention window is 8.

5. The communication method of claim 1, further comprising:
   assessing whether the channel is to be idle in the contention window, and
   transmitting, when the channel is assessed to be idle in the contention window, the packet through the channel.

6. A communication terminal of a wireless sensor network using a contention-based channel access mechanism, comprising:
   a memory unit which stores a packet carrying data collected by the terminal;
   a control unit which:
      initializes a contention window to a size, when a packet transmission is required,
      counts a number of resets of the contention window resets, the size of the contention window in a hybrid expansion mode when a channel is assessed to be busy, including increasing the size of the contention window linearly, when a parameter indicates a linear expansion, and increasing the size of the contention window exponentially, when the parameter indicate an exponential expansion and,
      attempts the packet transmission through the channel, when the channel is assessed to be idle, and
   a radio frequency unit which collects the data and transmits the packet when the channel is assessed to be idle,
   wherein the control unit increases the size of the contention window as:

$CW_i = CW_{i-1} = c, \mod(i,n) \neq 0 (i \geq 1)$ wherein i is the number of resets,
      $CW_i$ is the size of the contention window,
      $CW_{i-1}$ is a previous size of the contention window,
      c is a linear expansion constant, and
      n is a number of expansion resets in which the size of contention window is expanded.

7. The communication terminal of claim 6, wherein the control unit increases the size of the contention window exponentially as:

$CW_i = eCW_{i-1}, \mod(i,n) = 0 (i \geq 1)$ wherein e is an exponential expansion constant.

8. The communication terminal of claim 6, wherein the control unit initializes the size of the contention window as:

$CW_i = CW_{min}, i=0,$ wherein the $CW_{min}$ is a minimum size of the contention window.

9. The communication terminal of claim 8, wherein the number of expansion resets is 3, the linear expansion constant is 2, and the exponential constant is 2, and the minimum size of the contention window is 8.

10. A contention-based channel access mechanism device, comprising:
   a processor in communication with a memory the memory including code, which when accessed by the code causes the processor to:
      initialize a contention window to a known size, when a packet transmission is required;

count a number of resets of the contention window;

reset the size of the contention window in a hybrid expansion mode, when a channel is assessed to be busy, including increasing the size of the contention window one of linearly and exponentially when a parameter indicates a linear expansion or an exponential expansion, respectively; and attempt the packet transmission through the channel, when the channel is assessed to be idle, wherein increasing the size of the contention window linearly comprises calculating a new size of the contention window as:

$$CW_i = CW_{i-1} = c, \mod(i,n) \neq 0 (i \geq 1)$$

wherein i is the number of resets,

CW$_i$ is the size of the contention window,

CW$_{i-1}$ is a previous size of the contention window, c is a linear expansion constant, and n is a number of expansion resets in which the size of contention window is expanded.

11. The device of claim 10, wherein increasing the size of the contention window exponentially comprises calculating a new size of the contention window as:

$$CW_i = eCW_{i-1}, \mod(i,n) = 0 (i \geq 1)$$

wherein e is an exponential expansion constant.

12. The device of claim 10, wherein initializing the contention window comprises calculating the size of the contention window using an equation, $$CW_i = CW_{min}, i=0,$$

wherein the CW$_{min}$ is a minimum size of the contention window.

13. The device of claim 12, wherein the number of expansion resets is 3, the linear expansion constant is 2, and the exponential constant is 2, and the minimum size of the contention window is 8.

14. The device of claim 10, further comprising:

assessing whether the channel is to be idle in the contention window, and transmitting, when the channel is assed to be idle in the contention window, the packet through the channel.

* * * * *

UNITED STATES PATENT AND TRADEMARK OFFICE
CERTIFICATE OF CORRECTION

PATENT NO. : 8,194,695 B2
APPLICATION NO. : 12/351902
DATED : June 5, 2012
INVENTOR(S) : Eui Jik Kim et al.

It is certified that error appears in the above-identified patent and that said Letters Patent is hereby corrected as shown below:

Column 7, Claim 1, Line 50 should read as follows:
--...+c, mod $(l,n) \neq 0$ $(i \geq 1)$,--

Column 8, Claim 6, Line 36 should read as follows:
--...+c, mod $(l,n) \neq 0$ $(i \geq 1)$,--

Column 9, Claim 10, Line 14 should read as follows:
--...+c, mod $(l,n) \neq 0$ $(i \geq 1)$,--

Column 10, Claim 14, Line 20 should read as follows:
--...channel is assessed to be...--

Signed and Sealed this
Thirtieth Day of October, 2012

David J. Kappos
*Director of the United States Patent and Trademark Office*